United States Patent
Ong et al.

(10) Patent No.: US 12,548,169 B2
(45) Date of Patent: *Feb. 10, 2026

(54) METHOD OF IDENTIFYING A TARGET SUBJECT, APPARATUS AND NON-TRANSITORY COMPUTER READABLE MEDIUM

(71) Applicant: NEC Corporation, Tokyo (JP)

(72) Inventors: Hui Lam Ong, Singapore (SG); Hong Yen Ong, Singapore (SG); Xinlai Jiang, Singapore (SG)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,868

(22) Filed: Oct. 11, 2023

(65) Prior Publication Data
US 2024/0037760 A1 Feb. 1, 2024

Related U.S. Application Data

(63) Continuation of application No. 17/623,326, filed as application No. PCT/JP2020/025162 on Jun. 26, 2020, now Pat. No. 12,198,354.

(30) Foreign Application Priority Data

Jul. 5, 2019 (SG) .......................... 10201906302X

(51) Int. Cl.
*G06T 7/20* (2017.01)
*G06V 10/22* (2022.01)
(Continued)

(52) U.S. Cl.
CPC .............. *G06T 7/20* (2013.01); *G06V 10/22* (2022.01); *G06V 10/759* (2022.01);
(Continued)

(58) Field of Classification Search
CPC .. G06T 7/00; G06T 7/80; G06T 7/292; G06T 7/215; G06T 7/20; G06T 2207/10004;
(Continued)

(56) References Cited

U.S. PATENT DOCUMENTS

2012/0314907 A1* 12/2012 Casamona ................ G06T 7/20 382/103
2014/0247374 A1 9/2014 Murakami et al.
2018/0286072 A1* 10/2018 Tsai ....................... G05D 1/249

FOREIGN PATENT DOCUMENTS

EP 3244344 A1 11/2017
JP 2010244089 A * 10/2010
(Continued)

OTHER PUBLICATIONS

Bensebaa, A., Larabi, S., Robertson, N. (2015). Inferring Heading Direction from Silhouettes. In: Tavares, J., Natal Jorge, R. (eds) Developments in Medical Image Processing and Computational Vision. Lecture Notes in Computational Vision and Biomechanics, vol. 19. Springer, Cham. (Year: 2015).*

(Continued)

*Primary Examiner* — Sumati Lefkowitz
*Assistant Examiner* — Aaron Joseph Sorrin
(74) *Attorney, Agent, or Firm* — Sughrue Mion, PLLC

(57) ABSTRACT

In one aspect, a method includes receiving an image of a target subject; determining a direction in response to the receipt of the image, the direction being one in which the target subject was likely to move during a time period in the past or is likely to move during a time period in the future; determining a target area within which another image of the target subject can be expected to appear based on the determined direction; and determining if a portion of a subsequent image is outside the determined target area to identify if the subsequent image is one relating to the target (Continued)

subject, wherein the subsequent image is one taken during the time period in the past or during the time period in the future.

6 Claims, 14 Drawing Sheets

(51) Int. Cl.
*G06V 10/75* (2022.01)
*G06V 40/16* (2022.01)

(52) U.S. Cl.
CPC .. *G06V 40/161* (2022.01); *G06T 2207/30201* (2013.01); *G06V 2201/07* (2022.01)

(58) Field of Classification Search
CPC . G06T 2207/30232; G06T 2207/30196; G06T 7/70; G06T 2207/30201; G06V 20/52; G06V 40/172; G06V 20/46; G06V 2201/07; G06V 40/173; G06V 10/22; G06V 10/759; G06V 40/161
See application file for complete search history.

(56) References Cited

FOREIGN PATENT DOCUMENTS

| | | |
|---|---|---|
| JP | 2012-073971 A | 4/2012 |
| JP | 2013-153304 A | 8/2013 |
| WO | 2017/027212 A1 | 2/2017 |

OTHER PUBLICATIONS

JP-2010244089-A—Original and English Translation (Year: 2010).*
International Search Report for PCT Application No. PCT/JP2020/025162, mailed on Sep. 24, 2020.
US Office Action for U.S. Appl. No. 17/623,326, mailed on May 17, 2024.
Bensebaa, A., Larabi, S., Robertson, N., "Inferring Heading Direction from Silhouettes", In: Tavares, J., Natal Jorge, R. (eds) Developments in Medical Image Processing and Computational Vision. Lecture Notes in Computational Vision and Biomechanics, vol. 19. Springer, Cham. (Year: 2015), p. 319-p. 334.

* cited by examiner

METHOD OF IDENTIFYING A TARGET SUBJECT, APPARATUS AND NON-TRANSITORY COMPUTER READABLE MEDIUM

CROSS-REFERENCE TO RELATED APPLICATIONS

This application is a Continuation of U.S. application Ser. No. 17/623,326 filed on Dec. 28, 2021, which is a National Stage Entry of PCT/JP2020/025162 filed on Jun. 26, 2020, which claims priority from Singaporean Patent Application 10201906302X filed on Jul. 5, 2019, the contents of all of which are incorporated herein by reference, in their entirety.

TECHNICAL FIELD

The present disclosure relates to a method, an apparatus, and a non-transitory computer readable medium.

BACKGROUND ART

Video analytics have been getting more popular in recent years due to breakthroughs of deep learning algorithms and availability of affordable higher processing power hardware.

Particularly, face recognition has been adopted in the following domain as public safety solutions to assist law enforcement's investigation, authentication in online transaction payment solutions and contactless identity recognition in physical access authorization.

In recent times, face recognition solutions split face detection and person recognition function into different software services, allowing for creation of one integrated system through distributed processing powered by different machines with centralization of a registered person list for easy maintenance. These features provide benefits, when compared to traditional silo solutions that are not so integrated and expensive to scale, particularly when multiple cameras are deployed.

SUMMARY OF INVENTION

Technical Problem

In a distributed processing architecture, detection systems are used to interpret images from video streaming input to generate detection data event such a face or a person. These detection data events will then be sent to other services for further processing. During the transmission of data events from one system to another within the distributed processing architecture, individual data events are typically not sent in a chronological order due to the nature of the multi-threaded processing.

Almost all of the existing detection deduplicate algorithms rely on the sequential of data or unique identifier number (person) to reduce detection duplications. Therefore, they cannot identify a target subject in the situation shown above.

An object of the present disclosure is to provide a method, an apparatus and a non-transitory computer readable medium capable of identifying a target subject.

Solution to Problem

In a first example aspect, a method comprising: receiving an image of a target subject; determining a direction in response to the receipt of the image, the direction being one in which the target subject was likely to move during a time period in the past or is likely to move during a time period in the future; determining a target area within which another image of the target subject can be expected to appear based on the determined direction; and determining if a portion of a subsequent image is inside the determined target area to identify if the subsequent image is one relating to the target subject, wherein the subsequent image is one taken during the time period in the past or during the time period in the future.

In a second example aspect, an apparatus comprising: at least one processor; and at least one memory including a computer program code; the at least one memory and the computer program code being configured to, with at least one processor, cause the apparatus at least to: receive an image of a target subject; determine a direction in response to the receipt of the image, the direction being one in which the target subject was likely to move during a time period in the past or is likely to move during a time period in the future; determine a target area within which another image of the target subject can be expected to appear based on the determined direction; and determine if a portion of a subsequent image is inside the determined target area to identify if the subsequent image is one relating to the target subject, wherein the subsequent image is one taken during the time period in the past or during the time period in the future.

In a third example aspect, a non-transitory computer readable medium storing a program for causing a computer to execute: receiving an image of a target subject; determining a direction in response to the receipt of the image, the direction being one in which the target subject was likely to move during a time period in the past or is likely to move during a time period in the future; determining a target area within which another image of the target subject can be expected to appear based on the determined direction; and determining if a portion of a subsequent image is inside the determined target area to identify if the subsequent image is one relating to the target subject, wherein the subsequent image is one taken during the time period in the past or during the time period in the future.

Advantageous Effects of Invention

According to the present disclosure, it is possible to provide a method, an apparatus and a non-transitory computer readable medium capable of identifying a target subject.

DESCRIPTION OF EMBODIMENTS

Figure 1:
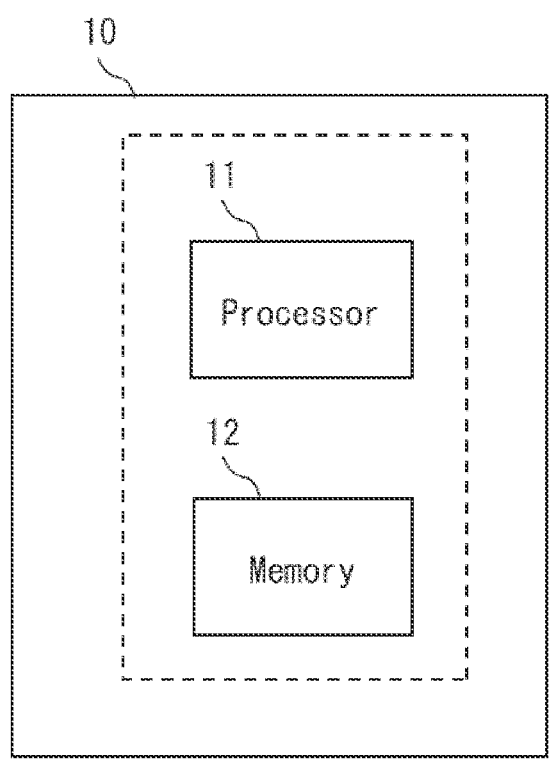
FIG. 1 shows a block diagram of an apparatus according to an embodiment.

Prior to explaining embodiments according to this present disclosure, some notes should be explained as follows.

In the field of the video analytics, most of the existing solutions focus on detecting and identifying a person who has been registered. A registered person may be one who is assigned a unique identifier for data processing.

Conventionally, face recognition solution combines both face detection and person recognize functions and focuses on matching registered persons to generate alert within an application software, this is not cost effective and hard to maintain when the number of cameras is increasing. Therefore, face recognition solutions which split face detection and person recognition function into different software services have been developed. However, almost all of the existing detection deduplicate algorithms can not identify a target subject when individual data events are not sent in a chronological order. The present disclosure can solve the problem.

Furthermore, other desirable features and characteristics will become apparent from the subsequent detailed description and the appended claims, taken in conjunction with the accompanying drawings and this background of the disclosure.

Embodiments of the disclosure will be better understood and readily apparent to one of ordinary skill in the art from the following written description, by way of example only, and in conjunction with the drawings.

Embodiments of the present disclosure will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "calculating", "determining", "updating", "generating", "initializing", "outputting", "receiving", "retrieving", "identifying", "dispersing", "authenticating" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium (e.g. electric wires, and optical fibers) such as exemplified in the Internet system, or wireless medium such as exemplified in the GSM (Global System for Mobile Communications) mobile telephone system. Furthermore, the computer readable medium may any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). Also, the program may be provided to a computer using any type of transitory computer readable media. Examples of transitory computer readable media include electric signals, optical signals, and electromagnetic waves. The computer program when loaded and executed on such a computer effectively results in an apparatus that implements the steps of the preferred method.

Various embodiments of the present disclosure relate to methods and apparatuses for adaptively identifying a target subject. In an embodiment, the method and apparatus determine if a portion of a subsequent image is inside the determined target area to identify if the subsequent image is one relating to the target subject.

First Example Embodiment

A first example embodiment of the disclosure is explained below referring to FIG. 1.

FIG. 1 shows a block diagrams of an apparatus 10. The apparatus 10 includes at least one processor 11 and at least one memory 12. In this embodiment, the apparatus 10 includes one processor 11 and one memory 12, but the number of these parts are not limited to this example. The memory 12 includes a computer program code.

The memory 12 and the computer program code are configured to the processor 11 cause the apparatus 10 at least to:
  receive an image of a target subject;
  determine a direction in response to the receipt of the image, the direction being one in which the target subject was likely to move during a time period in the past or is likely to move during a time period in the future;
  determine a target area within which another image of the target subject can be expected to appear based on the determined direction; and
  determine if a portion of a subsequent image is inside the determined target area to identify if the subsequent image is one relating to the target subject, wherein the subsequent image is one taken during the time period in the past or during the time period in the future.

The method done by the apparatus 10 can detect subsequent images related to the target subject regardless of their chronological order, therefore, it enables the apparatus 10 to identify the target subject.

Second Example Embodiment

A second example embodiment of the disclosure is explained below referring to the accompanying drawings. As can be seen below, the method and the apparatus disclosed here are capable for identifying a target subject, especially for event throttling.

Figure 2:
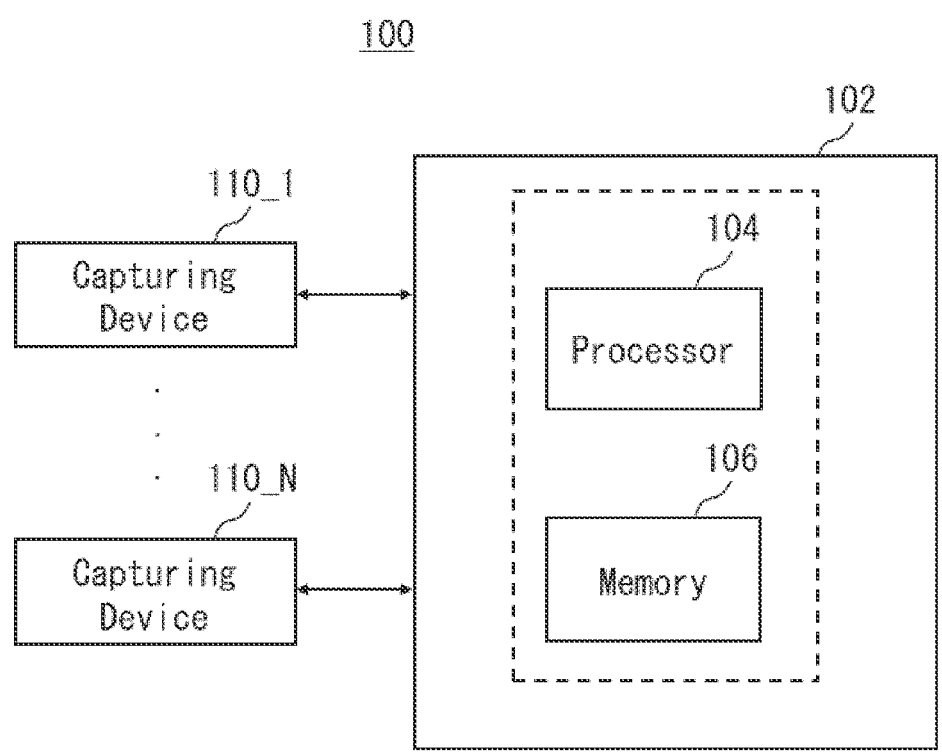
FIG. 2 shows a block diagram of a system within which a target subject may be adaptively identified according to an embodiment.

FIG. 2 shows a block diagrams of a system 100 within which a target subject may be adaptively identified according to an embodiment. Referring to FIG. 2, identification of the target subject process involves an apparatus 102 that is operationally coupled to at least one image capturing device 110. In FIG. 2, there N image capturing devices from 110_1 to 110_N. Each image capturing device 110 is configured to capture and send at least an image of the target subject at a location. The image capturing device 110 may be, among other things, include a face detection system, a video capturing device, a camera and a motion sensor. The apparatus 102 is configured to receive the image of the target subject.

The image capturing device 110 is capable of wireless communication using a suitable protocol with the apparatus 102. For example, embodiments may be implemented using image capturing devices 110 that are capable of communicating with WiFi®: Registered trademark)/Bluetooth®: Registered trademark)-enabled apparatus 102. It will be appreciated by a person skilled in the art that depending on the wireless communication protocol used, appropriate handshaking procedures may need to be carried out to establish communication between the image capturing devices 110 and the apparatus 102. For example, in the case of Bluetooth®: Registered trademark) communication, discovery and pairing of the image capturing device 110 and the apparatus 102 may be carried out to establish communication.

In an example, an image of a target subject is captured (or detected) at the image capturing device 110 at a predetermined frames per second (or fps). The image of the target subject may be captured as the target subject moves in a region and a plurality of images will be captured, determining on the fps of the image capturing device 110. If the image capturing device 110 has a fps of 5, 5 frames of the target subject will be captured within 1 second and transmitted to the apparatus 102. For various reasons, the captured images may not be transmitted to the apparatus 102 in a chronological manner in which successive images that are taken during a time period are sent in a successive way.

The apparatus 102 may include a processor 104 and a memory 106. In embodiments of the disclosure, the memory 106 and the computer program code, with processor 104, are configured to cause the apparatus 102 to receive an image of the target subject, determine a direction in response to the receipt of the image, the direction being one in which is the target subject was likely to move during a time period in the past or is likely to move during a time period in the future; determine a target area within which another image of the target subject can be expected to appear based on the determined direction; and determine if a portion of a subsequent image is outside the determined target area to identify if the subsequent image is one relating to the target subject, wherein the subsequent image is one taken during the time period in the past or during the time period in the future.

The apparatus 102 may be a server. In embodiments of the present disclosure, use of the term 'server' may mean a single computing device or at least a computer network of interconnected computing devices which operate together to perform a particular function. In other words, the server may be contained within a single hardware unit or be distributed among several or many different hardware units.

Figure 3:
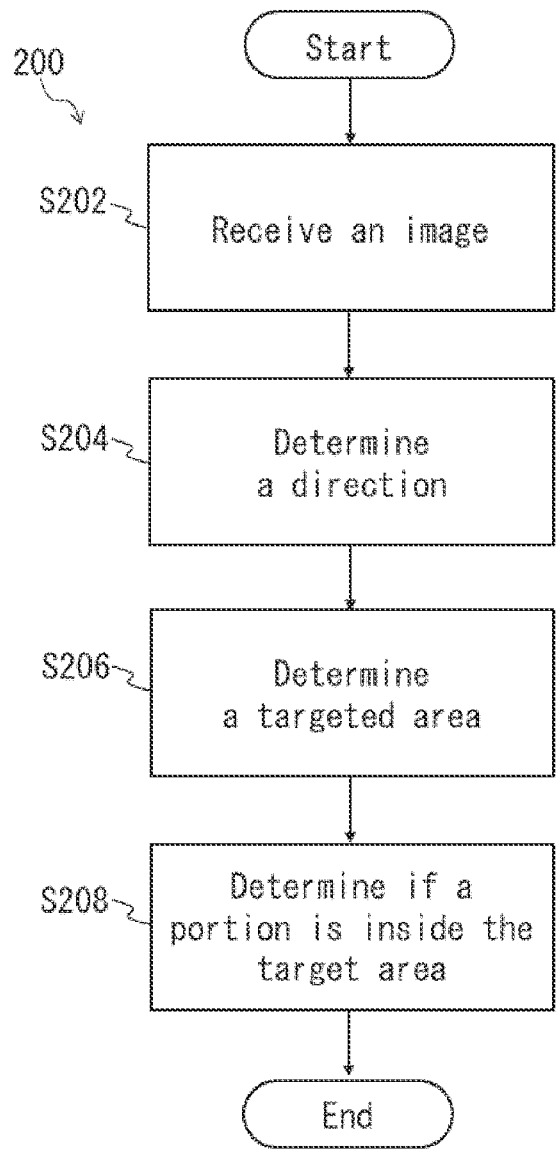
FIG. 3 shows a flowchart illustrating a method for adaptively identifying a target subject in accordance with embodiments of the disclosure.

Such a server may be used to implement the method 200 shown in FIG. 3. FIG. 3 shows a flowchart illustrating a method 200 for adaptively identifying a target subject in accordance with embodiments of the disclosure.

Conventionally, images that are not related to the subject may still be taken into consideration for identifying a target subject. This reduces the effectiveness and accuracy of the technique.

Thus, embodiments of the present disclosure can adaptively identify a target subject based on any image relating to the target subject. The image does not have to be the first image or a successive one of the previously received images. That is, the images that are transmitted to the apparatus 102 do not have to be in a chronological manner. This is made possible because various embodiments determine a direction in which the target subject was likely to move during a time period in the past or is likely to move during a time period in the future. In stark contrast, conventional techniques may only process images that are received in a chronological manner.

The method 200 broadly includes:
  step 202: receiving, by a processor, an image of the target subject, step 204: determining, by the processor, a direction in response to the receipt of the image, the direction being one in which the target subject was likely to move during a time period in the past or is likely to move during a time period in the future, step 206: determining, by the processor, a target area within which another image of the target subject can be expected to appear based on the determined direction, and step 208: determining, by the processor, if a portion of a subsequent image is outside or inside the determined target area to identify if the subsequent image is one relating to the target subject, wherein the subsequent image is one taken during the time period in the past or during the time period in the future.

Existing face recognition solutions often use face detection and a person recognition function as two separate functions, making creation of an integrated system through distributed processing difficult. This is especially so for an integrated system through distributed processing powered by different machines with a centralisation of registered person list for easy maintenance. This is in contrast to a conventional silo solution that is not integrated and expensive to scale when it involves a larger number of camera deployment.

Figure 4A:
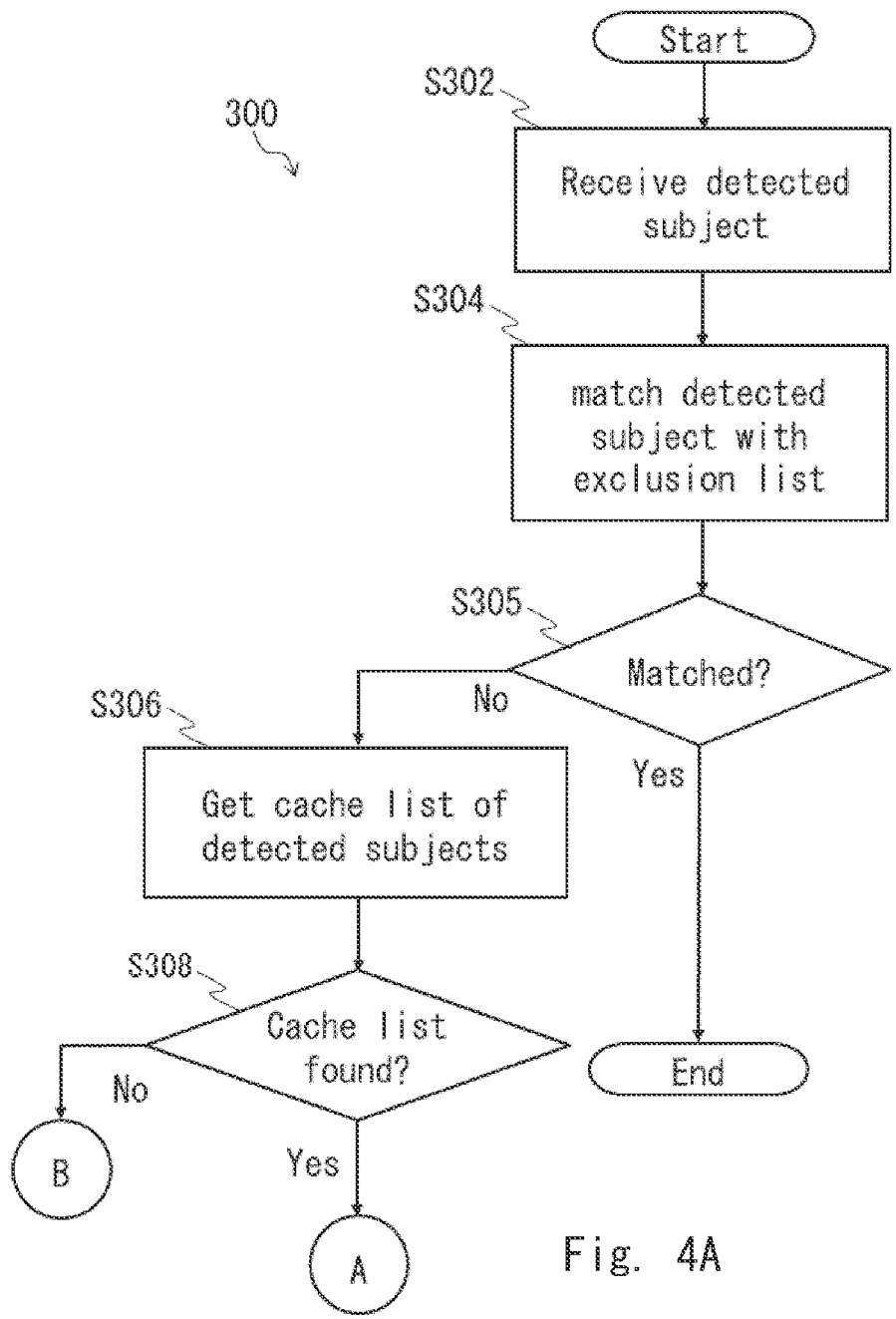
FIG. 4A shows a flowchart 300 illustrating how a target subject may be adaptively identified.
Figure 4B:
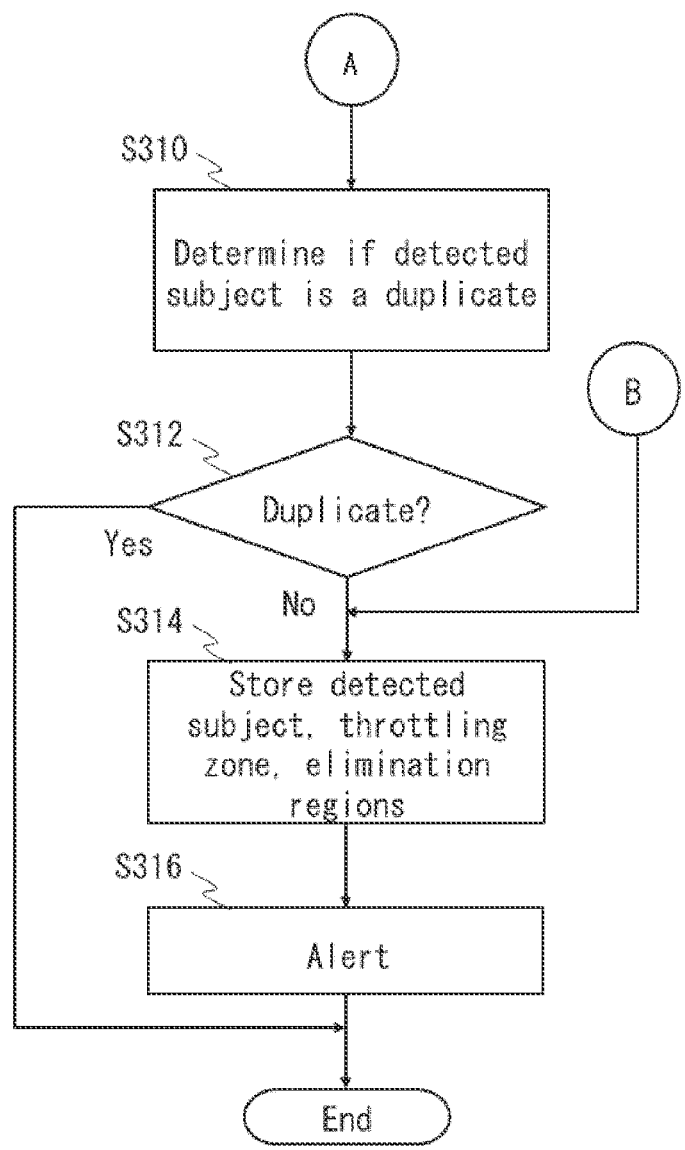
FIG. 4B shows a flowchart 300 illustrating how a target subject may be adaptively identified.

FIGS. 4A and 4B show a flowchart 300 illustrating how a target subject may be adaptively identified. The system may include an identifying server which is operationally coupled to an image capturing devices and a transmitter for transmitting other data relevant to a vehicle.

The identifying server typically is associated with a surveillance provider or a party who is providing surveillance. A surveillance provider may be an entity (e.g. a company or organization) which administers (e.g. manages) images (e.g. a bus). As stated in the above, server may include one or more computing devices that are used to establish communication with another server by exchanging messages with and/or passing information to another device (e.g., a sensor or server).

At step 302, an image of a target subject (detected subject) may be received. This image may be any frame out of a series of images captured during a time period. For example, it could be the first, second or third frame of a series of images captured at 5 fps.

At step 304, the method includes comparing information of the image, that is received at step 302, against an exclusion list that includes subjects that have been identified previously.

At step 305, the method includes comparing information of the image, that is received at step 302, to determine if the information of the image matches any information of the images in the exclusion list.

If it is determined that the information of the image matches any information of the one of the images in the exclusion list (Yes at step 305), the method ends. It is to be appreciated that steps 302, 304 and 305 may not be necessary for some embodiments.

If it is determined that the image does not match any one of the images in the exclusion list (No at step 305), the method goes to step 306. At step 306, a list of images of subjects taken at the same image capturing device will be retrieved. In other words, cache list of detected subjects of the same image source can be obtained.

At step 308, a process to determine if the list of subjects can be retrieved. In other words, it can be determined if the cache list was found.

At step 310, if it is determined that the list of subjects can be retrieved (Yes at step 308), a process will be carried out to determine if the target subject is a duplicate. That is, if images of the target subject have been previously received.

At step 312, a process will be carried out to determine if the target image is a duplicate. For example, an image is a duplicate if it is totally inside or within the target area, that is, there is no portion of the image is in contact with the elimination region. If it is determined that the target image is a duplicate (Yes at step 312), the method ends. If it is determined that the target image is not a duplicate (No at step 312), step 314 will be carried out.

At step 314, if it is determined that step 308 is negative (that is, the list of subjects cannot be retrieved), the method includes storing the information of the image. This includes the image captured by the same image capturing device, throttling zones of the past and future, and elimination regions of the past and future in cache of the same image source. At this step, an analysis of the target area is performed (finished).

As mentioned in the above, if it is determined that the target image is not a duplicate at step 312, step 314 will be carried out.

At step 316, an alert signal will be generated and transmitted. This step may be performed by the processor or a separate alert generate apparatus that is operationally coupled to the processor.

Figure 5A:
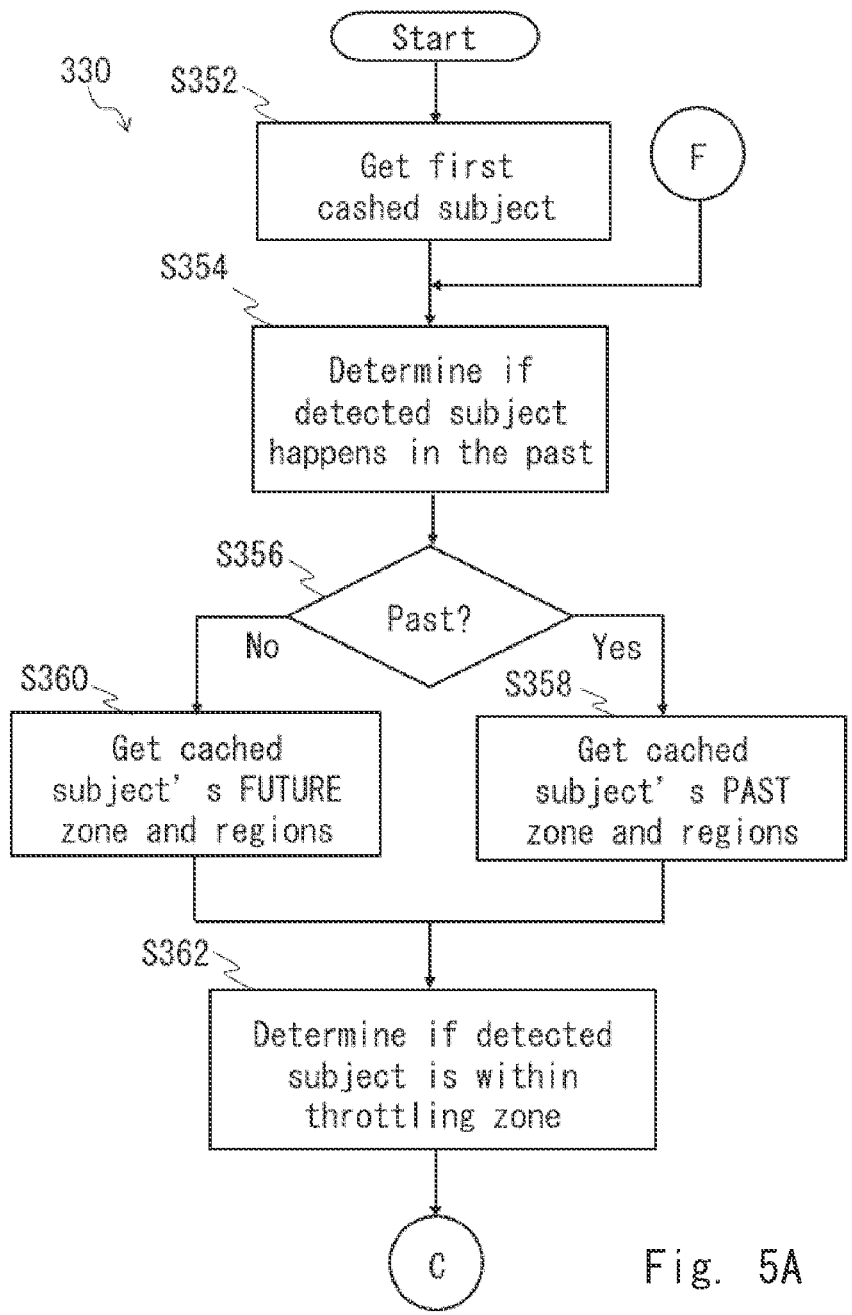
FIG. 5A shows a flowchart 330 illustrating how a target subject may be adaptively identified in accordance to an embodiment of the disclosure.
Figure 5B:
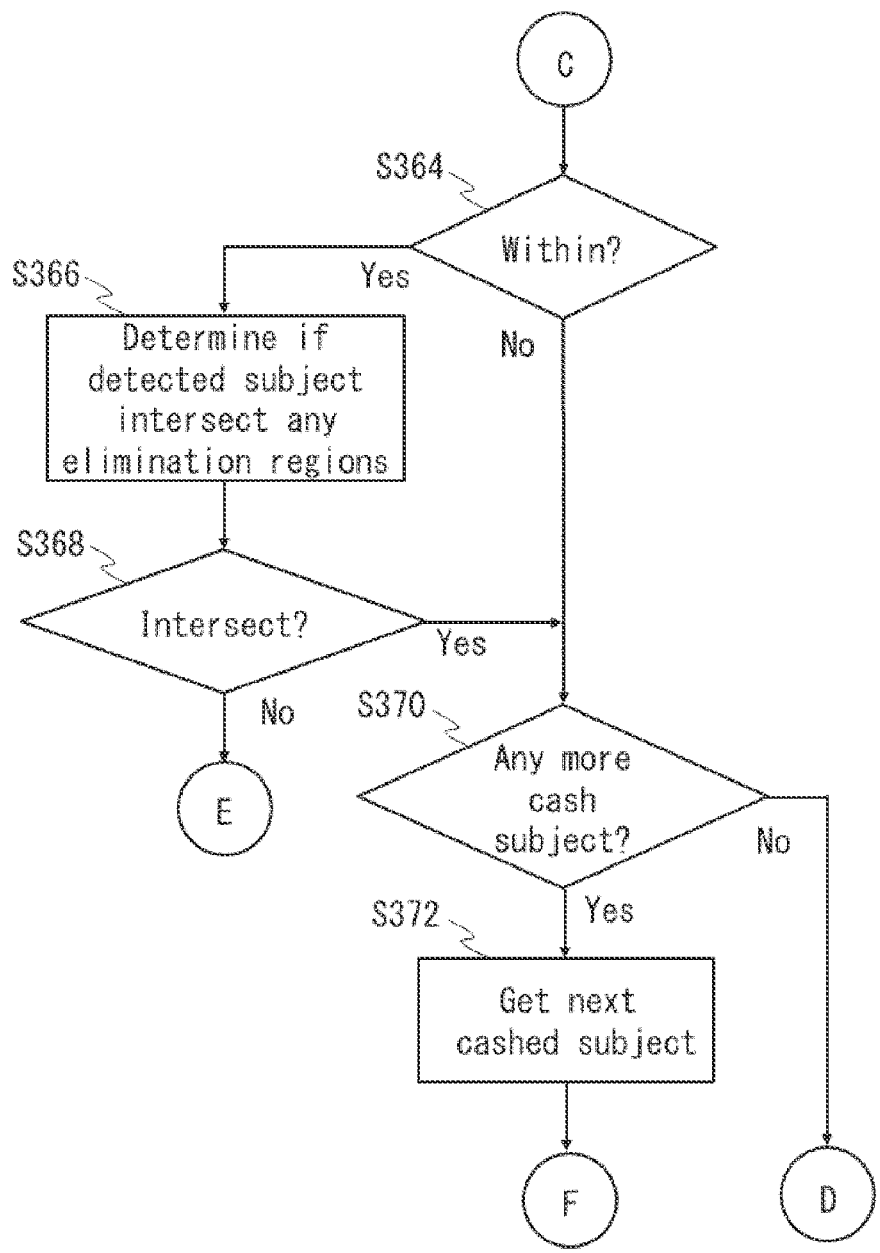
FIG. 5B shows a flowchart 330 illustrating how a target subject may be adaptively identified in accordance to an embodiment of the disclosure.
Figure 5C:
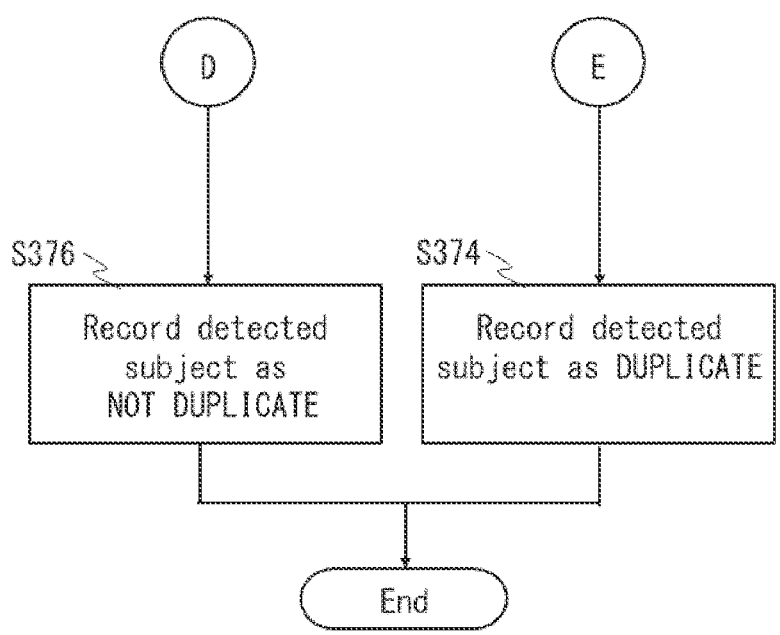
FIG. 5C shows a flowchart 330 illustrating how a target subject may be adaptively identified in accordance to an embodiment of the disclosure.

FIGS. 5A to 5C show a flowchart 330 illustrating how a target subject may be adaptively identified in accordance to an embodiment of the disclosure.

Step 352 is analogous to step 306 mentioned in FIG. 4A. At this step, first cached subject is obtained.

At step 354, the method includes determining if the image of a subject detected in step 352 is captured before in the past. In another words, the method includes determining if detected subject happens in the past before cached subject.

In response to step 354, it is determined in step 356 to find out if the image that is received, is one that has occurred in the past.

In response to step 356, if it is determined that the image of a subject detected in step 352 is captured before in the past (Yes at step 356), step 358 will be carried out.

In step 358, a past target area based on a direction of the subject will be retrieved. The direction being one in which the target subject was likely to move during a time period in the past, before the image that is received in step 302. The direction may be determined based on at least two points of a body (e.g., shoulder points or facial points). In an example, this step is performed based on the timestamp of the images in order to determine as to when the images are received. The target area may also be referred as a throttling zone and an area outside the determined target area may be referred as an elimination region. In step 358, cashed subject's past throttling zone and elimination regions are obtained.

In response to step 356, if it is determined that the received image is not captured before a subject whose images have been received (No at step 356), step 360 will be carried out. In step 360, a future target area based on a direction of the subject will be retrieved. The direction being one in which the target subject was likely to move during a time period in the future before the image that is received in step 302. In an example, this step is performed based on the timestamp of the images in order to determine as to when the images are received. The future target area may also be referred as a throttling zone in a time zone in the future and an area outside the determined target area may be referred as an elimination region. In step 360, cashed subject's future throttling zone and elimination regions are obtained.

Based on the target area determined in either step 358 or step 360, step 362 is performed. In step 362, it is determined if a portion of an image is within the target area. In another words, it is determined if the detected subject is within the throttling zone. That is, this step determines if the subject is or has been moving in a direction that is determined in step 358 or step 360. More details will be provided in following figures.

In response to step 362, step 364 is carried out. In step 364, the method comprises determining if a portion of an image is within the target area determined in either step 358 or step 360. If it is determined that the portion is within the target area (Yes at step 364), step 366 will be carried out. If it is determined that the portion of the image is not within the target area (No at step 364), step 370 will be carried out.

In response to step 364, step 366 is performed if it is determined that a portion of a subsequent image is outside the determined target area to identify if the subsequent image is one relating to the target subject. In step 366, it is determined if a portion of the image intersects any elimination region.

In an example, the method is carried out to determine if a portion of an image is outside the target area (or the throttling zone) determined in step 358 or step 360. That is, this step is performed to find out if the subject is moving in a manner that deviates from the direction that is expected of the subject within the time period.

In response to step 366, a step to determine if a portion of the image of the subject is outside the target area is carried out in step 368.

In response to step 368, if it is determined that the portion of the image of the subject is inside the target area (No at step 368), step 374 is carried out to record the image as a duplicate. Steps 362 to 364 can be regarded as a method to compare person detection.

In response to step 368, if it is determined that the portion of the image of the subject is not outside the target area (Yes at step 368), step 370 is carried out to find out if there are other images of the same subject.

In response to step 370, if it is determined that there is information of other images of the same subject (Yes at step 370), the method proceeds to obtain information of another image of the subject in step 372. After that, the steps from step 354 will be iterated.

In response to step 370, if it is determined that there is no information of other images of the same subject (No at step 370), the method proceeds to record the image as not a duplicate in step 376.

Figure 6A:
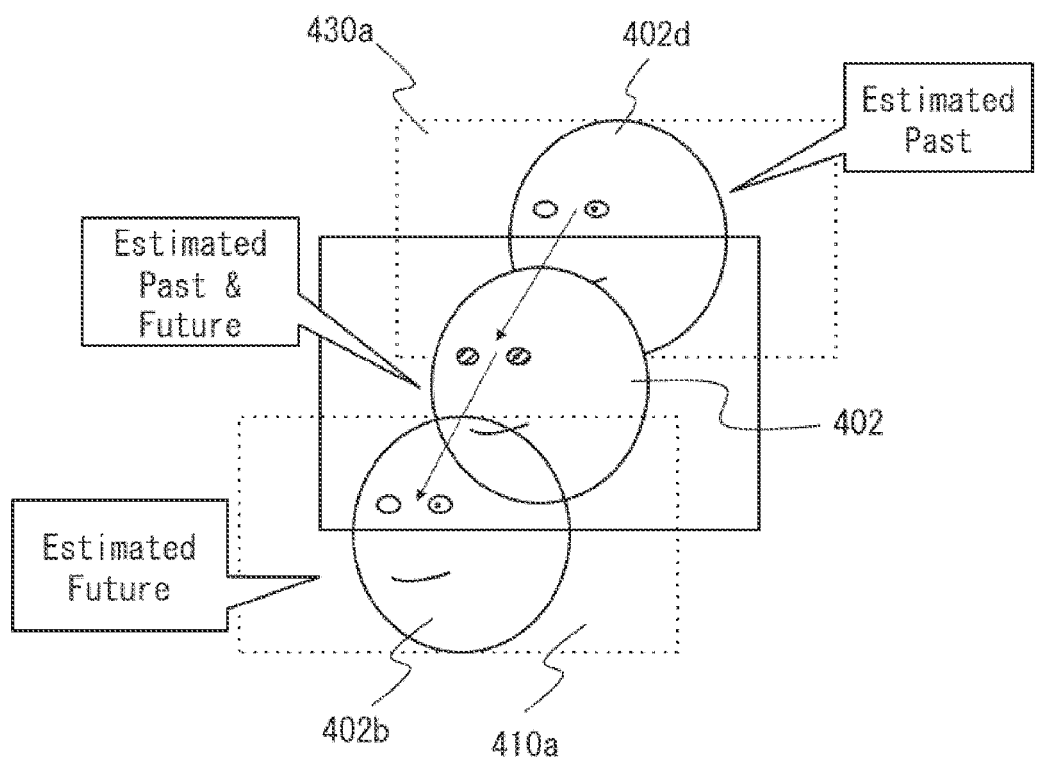
FIG. 6A depicts a schematic diagram on how the direction of a target subject may be determined according to an embodiment.

FIG. 6A depicts a schematic diagram on how the direction of a target subject may be determined according to an embodiment.

FIG. 6A shows a current detection of a target subject. This may be determined based on an image relating to the target subject. A person skilled in the art will appreciate there are various ways to determine the direction of movement of the target subject. For example, the direction may be determined based on two points of a body (like two should points) or two facial points.

In FIG. 6A, the target subject is represented by 402. In order to determine a direction in which he was likely to move during a time period in the past or is likely to move during a time period in the future, two points have to be taken in consideration for calculating distance, namely the centre of the head and position of his eyes.

Figure 6B:
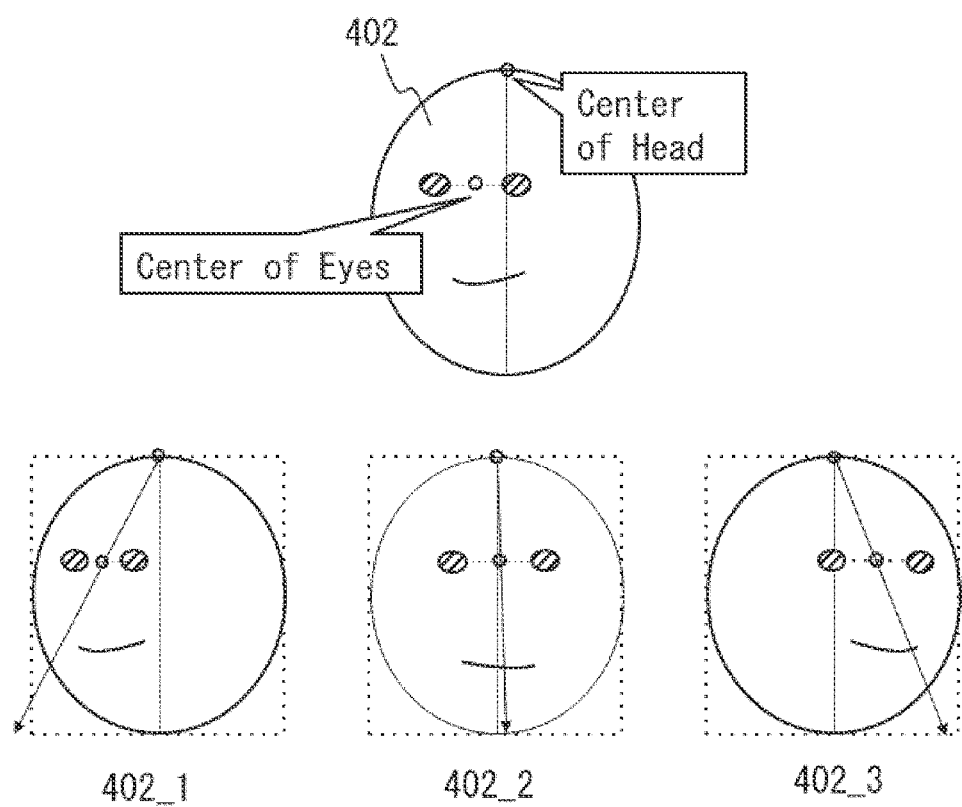
FIG. 6B depicts coordinates for determining a direction and examples of faces.

As shown in FIG. 6B, coordinates of Center of Head and Center of Eyes are used to determine the direction of movement of the target subject. The target subject 402_1 to 402_3 are examples of faces, and each face's orientation differs from each other. The coordinates of these points are then obtained where $H_{CX}$ represents Center of Head's "x", $H_{CY}$ represents Center of Head's "y", $H_X$ represents Head's top left "x" and $H_W$ represents Head's width. $E_{CX}$ represents Center of Eyes "x", $E_{CY}$ represents Center of Eyes "y", $E_{LX}$ represents Left Eye point "x" and $E_{RX}$ represents Right Eye point "x" and $FH_H$ represents Forehead's height. The direction may be determined as follows:

$$H_{CX}=H_X+(H_W/2),$$

$$E_{CX}=E_{LX}+((E_{RX}-E_{LX})/2), \text{ and}$$

$$FH_H=E_{LY}-H_{CY}.$$

As shown in FIG. 6A, the current position of the subject is shown by reference 402. Based on the direction of his head, the subject, which is depicted by 402d, likely shows the direction of the subject during a time period in the past (in FIG. 6A, it is shown as "Estimated Past".). A target area is then determined based on 402d and is depicted by 430a. Based on the direction of his head, the subject, which is depicted by 402b, likely shows the direction of the subject during a time period in the future (in FIG. 6A, it is shown as "Estimated Future".). A target area is then determined based on 402b and is depicted by 410a.

Figure 6C:
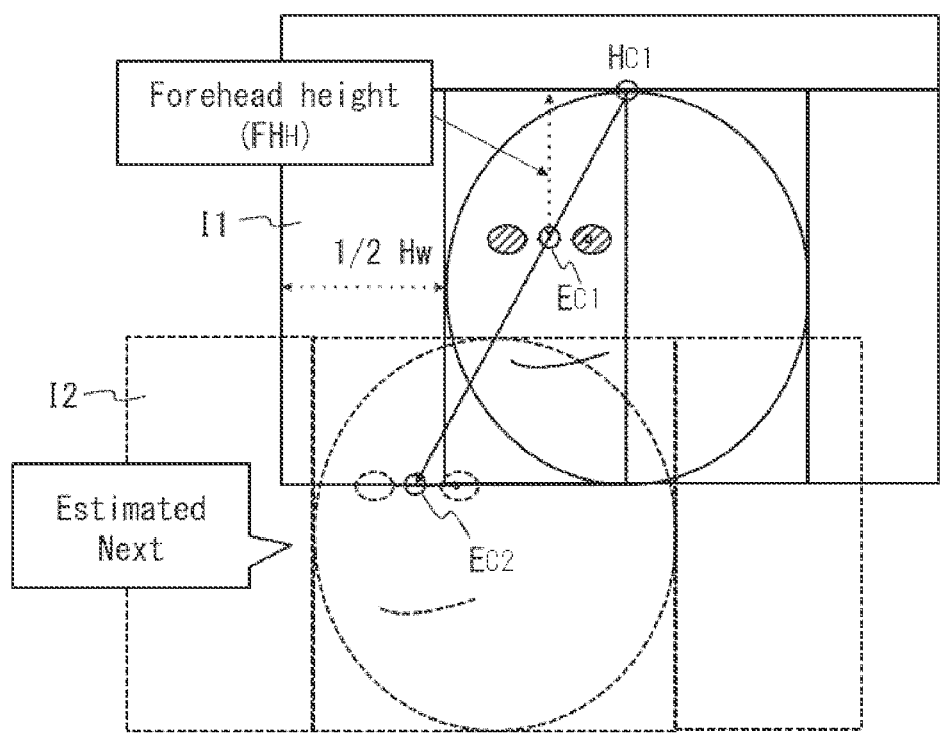
FIG. 6C depicts a schematic diagram on how the direction of a target subject during a time period in the future may be determined.

FIG. 6C depicts a schematic diagram on how the direction of a target subject during a time period in the future may be determined. As shown above, the direction may be determined as follows:

$$H_{CX}=H_X+(H_W/2),$$

$$E_{CX}=E_{LX}+((E_{RX}-E_{LX})/2), \text{ and}$$

$$FH_H=E_{LY}-H_{CY}$$

In FIG. 6C, $H_{C1}$ ($H_{C1X}$, $H_{C1Y}$) represents a position coordinate of Center of Head in image I1, while $H_{C1X}$ represents Center of Head's "x" and $H_{C1Y}$ represents Center of Head's "y". $E_{C1}$ ($E_{C1X}$, $E_{C1Y}$) represents a position coordinate of Center of Eyes in image I1, while $E_{C1X}$ represents Center of Eyes "x" and $E_{C1Y}$ represents Center of Eyes "y". $E_{C2}$ ($E_{C2X}$, $E_{C2Y}$) represents a position coordinate of Center of Eyes in image I2, while $E_{C2X}$ represents Center of Eyes "x" and $H_{C2Y}$ represents Center of Eyes "y". The image I2 is an estimated next image of the image I1. $E_{C2X}$ and $E_{C2Y}$ may be determined as follows:

$$E_{C2X}=H_{C1X}-(H_h H_{C1X}-H_h E_{C1X})/FH_H$$

$$E_{C2Y}=H_{C1Y}+H_h$$

Figure 6D:
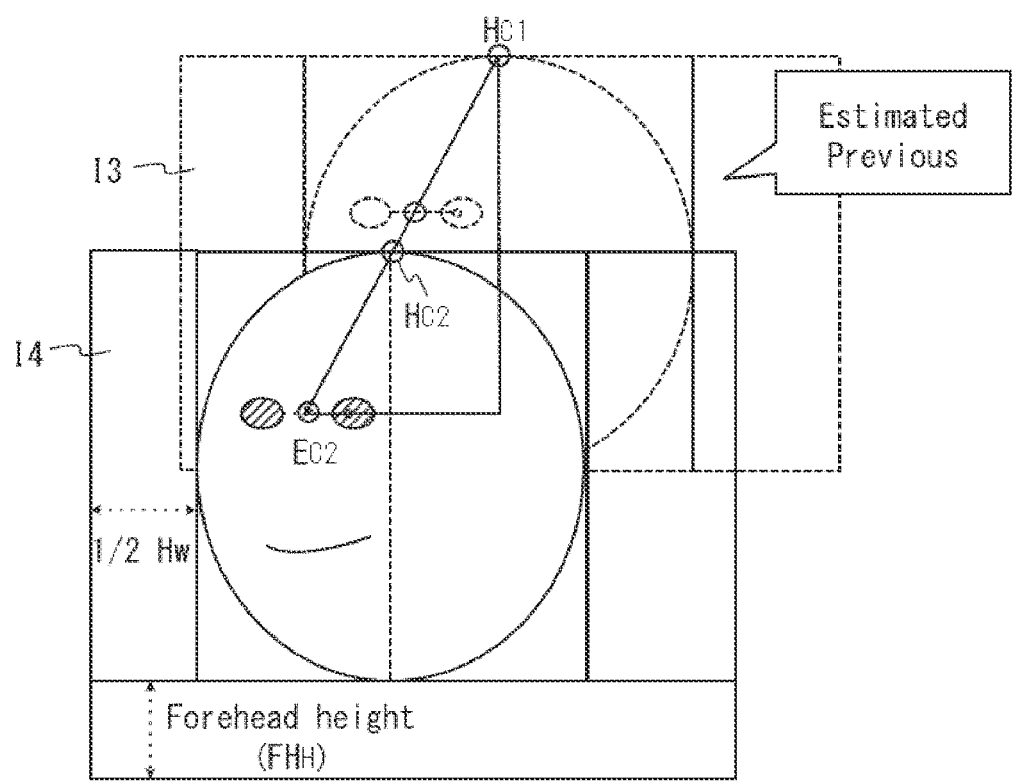
FIG. 6D depicts a schematic diagram on how the direction of a target subject during a time period in the past may be determined.

FIG. 6D depicts a schematic diagram on how the direction of a target subject during a time period in the past may be determined. In FIG. 6D, $H_{C1}$ ($H_{C1X}$, $H_{C1Y}$) represents a position coordinate of Center of Head in image I3, while $H_{C1X}$ represents Center of Head's "x", $H_{C1Y}$ represents Center of Head's "y". $H_{C2}$ ($H_{C2X}$, $H_{C2Y}$) represents a position coordinate of Center of Head in image I4, while $H_{C2X}$ represents Center of Head's "x", $H_{C2Y}$ represents Center of Head's "y". $E_{C2}$ ($E_{C2X}$, $E_{C2Y}$) represents a position coordinate of Center of Eyes in image I4, while $E_{C2X}$ represents Center of Eyes "x" and $E_{C2Y}$ represents Center of Eyes "y".

The image I3 is an estimated previous image of the image I4. $H_{C1X}$ and $H_{C1Y}$ may be determined as follows:

$$H_{C1X}=(E_{C2X}(H_{C1Y}-H_{C2Y})-H_{C2X}(H_{C1Y}-E_{C2Y}))/(E_{C2Y}-H_{C2Y})$$

$$H_{C1Y}=E_{C2Y}-H_h$$

FIGS. 6C and 6D depict how the direction of the target subject may be determined, taking into consideration of the forehead height of the subject because this parameter will affect how much the subject may move. Subsequently, this will affect the size of the target area. More detail on how the target area is determined will be provided in FIG. 7.

Figure 7:
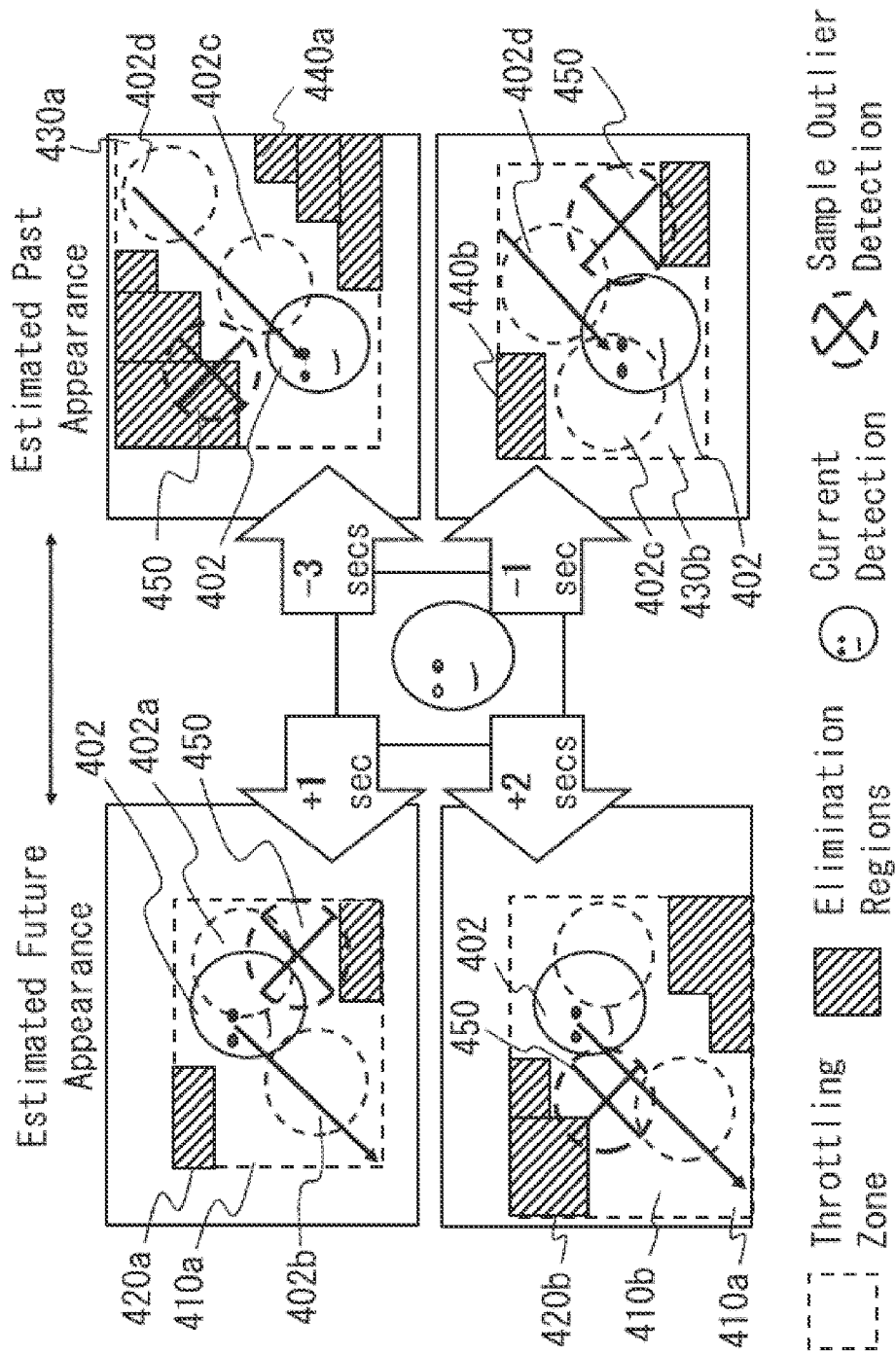
FIG. 7 depicts a schematic diagram on how the target areas may be determined.

FIG. 7 depicts a schematic diagram on how the target areas may be determined. Based on the current position of the target subject 402. The direction in which the target subject is likely to move during a time period in the future is depicted by 402a and 402b in the next two seconds (shown as "+1 sec" and "+2 sec"). The target area 410a area within which another image of the target subject can be expected to appear is determined based on the determined direction. In an example, the target area 410a, 410b may be an outline of images of the subject that can be expected to appear in a time period in the future. In order to adaptively identify the target subject, images that are within the target and have a portion of which in contact outside the target area 420a, 420b will be disregarded. The areas 420a, 420b are also known as elimination regions. These are shown as outlier images depicted as 450 in FIG. 7.

The direction in which the target subject was likely to move during a time period in the past is depicted by 402c and 402d in the previous three seconds (shown as "−1 sec" and "−3 sec"). The target area 430a area within which another image of the target subject can be expected to appear is determined based on the determined direction. In an example, the target area 430a, 430b may be an outline of images of the subject that can be expected to appear in a time period in the past. In order to adaptively identify the target subject, images that are within the target and have a portion of which in contact outside the target area 440a, 440b will be disregarded. The areas 440a, 440b are also known as elimination regions. These are shown as outlier images depicted as 450 in FIG. 7.

Figure 8:
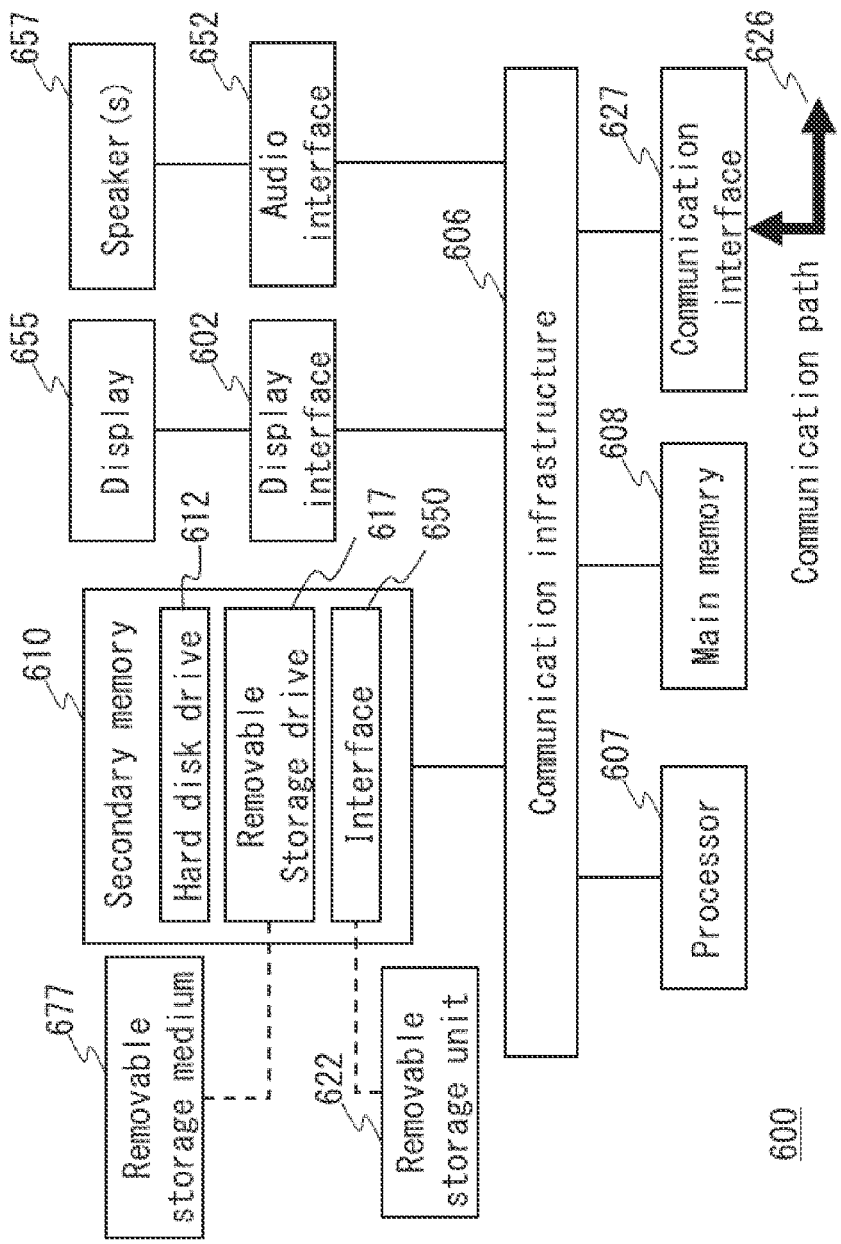
FIG. 8 shows an exemplary computing device that may be used to execute the method of FIGS. 3 to 5C.

FIG. 8 depicts an exemplary computing device 600, hereinafter interchangeably referred to as a computer system 600, where one or more such computing devices 600 may be used to execute the method of FIGS. 4A to 5C. The exemplary computing device 600 can be used to implement the system 100 shown in FIG. 2. The following description of the computing device 600 is provided by way of example only and is not intended to be limiting.

As shown in FIG. 8, the example computing device 600 includes a processor 607 for executing software routines. Although a single processor is shown for the sake of clarity, the computing device 600 may also include a multi-processor system. The processor 607 is connected to a communication infrastructure 606 for communication with other components of the computing device 600. The communication infrastructure 606 may include, for example, a communications bus, cross-bar, or network.

The computing device 600 further includes a main memory 608, such as a random-access memory (RAM), and a secondary memory 610. The secondary memory 610 may include, for example, a hard disk drive 612, which may be a solid state drive or a hybrid drive and a removable storage drive 617, which may include a magnetic tape drive, an optical disk drive, a solid state storage drive (such as a USB (Universal Serial Bus) flash drive, a flash memory device, a solid state drive or a memory card), or the like. The removable storage drive 617 reads from and/or writes to a removable storage medium 677 in a well-known manner. The removable storage medium 677 may include magnetic tape, optical disk, non-volatile memory storage medium, or the like, which is read by and written to by removable storage drive 617. As will be appreciated by persons skilled in the relevant art(s), the removable storage medium 677 includes a computer readable storage medium having stored therein computer executable program code instructions and/or data.

In an alternative implementation, the secondary memory 610 may additionally or alternatively include other similar means for allowing computer programs or other instructions to be loaded into the computing device 600. Such means can include, for example, a removable storage unit 622 and an interface 650. Examples of a removable storage unit 622 and interface 650 include a program cartridge and cartridge interface (such as that found in video game console devices), a removable memory chip (such as an EPROM (Erasable Programmable Read Only Memory) or PROM (Programmable Read Only Memory)) and associated socket, a removable solid state storage drive (such as a USB flash drive, a flash memory device, a solid state drive or a memory card), and other removable storage units 622 and interfaces 650 which allow software and data to be transferred from the removable storage unit 622 to the computer system 600.

The computing device 600 also includes at least one communication interface 627. The communication interface 627 allows software and data to be transferred between computing device 600 and external devices via a communication path 626. In various embodiments of the disclosures, the communication interface 627 permits data to be transferred between the computing device 600 and a data communication network, such as a public data or private data communication network. The communication interface 627 may be used to exchange data between different computing devices 600 which such computing devices 600 form part an interconnected computer network. Examples of a communication interface 627 can include a modem, a network interface (such as an Ethernet®): Registered trademark) card), a communication port (such as a serial, parallel, printer, GPIB (General Purpose Interface Bus), IEEE 1394, RJ45, USB), an antenna with associated circuitry and the like. The communication interface 627 may be wired or may be wireless. Software and data transferred via the communication interface 627 are in the form of signals which can be electronic, electromagnetic, optical or other signals capable of being received by communication interface 627. These signals are provided to the communication interface via the communication path 626.

As shown in FIG. 8, the computing device 600 further includes a display interface 602 which performs operations for rendering images to an associated display 655 and an audio interface 652 for performing operations for playing audio content via associated speaker(s) 657.

As used herein, the term "computer program product" may refer, in part, to removable storage medium 677, removable storage unit 622, a hard disk installed in storage drive 612, or a carrier wave carrying software over communication path 626 (wireless link or cable) to communication interface 627. Computer readable storage media refers to any non-transitory, non-volatile tangible storage medium that provides recorded instructions and/or data to the computing device 600 for execution and/or processing. Examples of such storage media include magnetic tape, CD-ROM (Compact Disc Read Only Memory), DVD (Digital Versatile Disc), Blu-ray Disc, a hard disk drive, a ROM (Read Only Memory) or integrated circuit, a solid state storage drive (such as a USB flash drive, a flash memory device, a solid state drive or a memory card), a hybrid drive, a magneto-optical disk, or a computer readable card such as a PCMCIA (Personal Computer Memory Card International Association) card and the like, whether or not such devices are internal or external of the computing device 600. Examples of transitory or non-tangible computer readable transmission media that may also participate in the provision of software, application programs, instructions and/or data to the computing device 600 include radio or infra-red transmission channels as well as a network connection to another computer or networked device, and the Internet or Intranets including e-mail transmissions and information recorded on Websites and the like.

The computer programs (also called computer program code) are stored in main memory 608 and/or secondary memory 610. Computer programs can also be received via the communication interface 627. Such computer programs, when executed, enable the computing device 600 to perform one or more features of embodiments discussed herein. In various embodiments, the computer programs, when executed, enable the processor 607 to perform features of the above-described embodiments. Accordingly, such computer programs represent controllers of the computer system 600.

Software may be stored in a computer program product and loaded into the computing device 600 using the removable storage drive 617, the storage drive 612, or the interface 650. The computer program product may be a non-transitory computer readable medium. Alternatively, the computer program product may be downloaded to the computer system 600 over the communications path 627. The software, when executed by the processor 607, causes the computing device 600 to perform the necessary operations to execute the method 200 as shown in FIG. 3.

It is to be understood that the embodiment of FIG. 8 is presented merely by way of example to explain the operation and structure of the system 100. Therefore, in some embodiments one or more features of the computing device 600 may be omitted. Also, in some embodiments, one or more features of the computing device 600 may be combined together. Additionally, in some embodiments, one or more features of the computing device 600 may be split into one or more component parts.

It will be appreciated that the elements illustrated in FIG. 8 function to provide means for performing the various functions and operations of the servers as described in the above embodiments.

When the computing device 600 is configured to perform the functions mentioned in the above, the computing system 600 will have a non-transitory computer readable medium having stored thereon an application which when executed causes the computing system 600 To perform steps comprising: receiving an image of the target subject; determining a direction in response to the receipt of the image, the direction being one in which the target subject was likely to move during a time period in the past or is likely to move during a time period in the future; determining a target area within which another image of the target subject can be expected to appear based on the determined direction; and determining if a portion of a subsequent image is outside the determined target area to identify if the subsequent image is one relating to the target subject, wherein the subsequent image is one taken during the time period in the past or during the time period in the future.

The processor shown in Example Embodiments may be, for example, a microprocessor, an MPU (Micro Processing Unit), or a CPU (Central Processing Unit). The processor may include a plurality of processors.

The memory shown in Example Embodiments is formed by a combination of a volatile memory and a nonvolatile memory. The memory may include a storage disposed apart from the processor. In this case, the processor may access the memory through an I/O interface.

The memory shown in Example Embodiments is used to store a group of software modules. The processor can perform processes performed by the information processing apparatus explained in the above-described embodiments by reading the group of software modules from the memory and executing the read software modules.

Each of the processors included in the apparatus in the above-described embodiments executes one or a plurality of programs including a group of instructions to cause a computer to perform an algorithm explained above with reference to the drawings.

Furthermore, the apparatus may include the network interface. The network interface is used for communication with other network node apparatuses forming a communication system. The network interface may include, for example, a network interface card (NIC) in conformity with IEEE 802.3 series.

Part of or all the foregoing embodiments can be described as in the following appendixes, but the present invention is not limited thereto.

Supplementary Note 1

A method comprising:
receiving an image of a target subject;
determining a direction in response to the receipt of the image, the direction being one in which the target subject was likely to move during a time period in the past or is likely to move during a time period in the future;
determining a target area within which another image of the target subject can be expected to appear based on the determined direction; and
determining if a portion of a subsequent image is inside the determined target area to identify if the subsequent image is one relating to the target subject, wherein the subsequent image is one taken during the time period in the past or during the time period in the future.

Supplementary Note 2

The method according to Supplementary Note 1, further comprising:
comparing information of the received image with information of one or more images in a list, each of the one or more images relating to a subject that has been detected; and
determining if there is a list relating to the target subject when the information of the received image corresponds to the information of the one or more images in the list.

Supplementary Note 3

The method according to Supplementary Note 2,
wherein the step of determining an analysis of the target area is performed when it is determined that there is no list relating to the target subject.

Supplementary Note 4

The method according to Supplementary Note 2 or 3, further comprising:
when it is determined there is a list relating to the target subject,
determining if the received image is captured before the one or more subjects in the list are captured,
wherein the determined direction is one in which the target subject was likely to move during the time period in the past and the target area is one within which another image of the target subject can be expected to appear during the time period in the past when it is determined that the received image is captured before the one or more subjects in the list are captured.

Supplementary Note 5

The method according to any one of Supplementary Notes 2 to 4,
when it is determined there is a list relating to the target subject,
determining if the received image is captured before the one or more subjects in the list are captured,
wherein the determined direction is one in which the target subject was likely to move during the time period in the future and the target area is one within which another image of the target subject can be expected to appear during the time period in the future when it is determined that the received image is not captured before the one or more subjects in the list are captured.

Supplementary Note 6

The method according to any one of Supplementary Notes 1 to 5, further comprising:
identifying a subject in the subsequent image as a duplicate if it is determined the portion of the subsequent image is inside the determined target area.

Supplementary Note 7

The method according to any one of Supplementary Notes 1 to 6, further comprising:
generating an alert signal.

Supplementary Note 8

The method according to any one of Supplementary Notes 1 to 7,
wherein the step of determining the direction is based on at least two body parts of the target subject.

Supplementary Note 9

An apparatus comprising:
at least one processor; and
at least one memory including a computer program code;
the at least one memory and the computer program code being configured to, with at least one processor, cause the apparatus at least to:
receive an image of a target subject;
determine a direction in response to the receipt of the image, the direction being one in which the target subject was likely to move during a time period in the past or is likely to move during a time period in the future;
determine a target area within which another image of the target subject can be expected to appear based on the determined direction; and
determine if a portion of a subsequent image is inside the determined target area to identify if the subsequent image is one relating to the target subject, wherein the subsequent image is one taken during the time period in the past or during the time period in the future.

Supplementary Note 10

The apparatus according to Supplementary Note 9,
wherein the at least one memory and the computer program code are configured to, with at least one processor, cause the apparatus at least to:
compare information of the received image with information of one or more images in a list, each of the one or more images relating to a subject that has been detected;
determine if there is a list relating to the target subject when the information of the received image corresponds to the information of the one or more images in the list.

Supplementary Note 11

The apparatus according to Supplementary Note 10,
wherein the at least one memory and the computer program code are configured to, with at least one processor, cause the apparatus at least to:
determine an analysis of the target area is performed when it is determined that there is no list relating to the target subject.

Supplementary Note 12

The apparatus according to Supplementary Note 10 or 11,
wherein the at least one memory and the computer program code are configured to, with at least one processor, cause the apparatus at least to:
when it is determined there is a list relating to the target subject,
determine if the received image is captured before the one or more subjects in the list are captured,
wherein the determined direction is one in which the target subject was likely to move during the time period in the past and the target area is one within which another image of the target subject can be expected to appear during the time period in the past when it is determined that the received image is captured before the one or more subjects in the list are captured.

Supplementary Note 13

The apparatus according to any one of Supplementary Notes 10 to 12,
wherein the at least one memory and the computer program code are configured to, with at least one processor, cause the apparatus at least to:
when it is determined there is a list relating to the target subject,
determine if the received image is captured before the one or more subjects in the list are captured,
wherein the determined direction is one in which the target subject was likely to move during the time period in the future and the target area is one within which another image of the target subject can be expected to appear during the time period in the future when it is determined that the received image is not captured before the one or more subjects in the list are captured.

Supplementary Note 14

The apparatus according to any one of Supplementary Notes 9 to 13, wherein the at least one memory and the computer program code are configured to, with at least one processor, cause the apparatus at least to identify a subject in the subsequent image as a duplicate if it is determined the portion of the subsequent image is inside the determined target area.

Supplementary Note 15

The apparatus according to any one of Supplementary Notes 9 to 14,
wherein the at least one memory and the computer program code are configured to, with at least one processor, cause the apparatus to generate at least an alert signal.

Supplementary Note 16

The apparatus according to any one of Supplementary Notes 9 to 15,
wherein the at least one memory and the computer program code are configured to, with at least one processor, cause the apparatus to determine that the direction is based on at least two body parts of the target subject.

Supplementary Note 17

A non-transitory computer readable medium storing a program for causing a computer to execute:
receiving an image of a target subject;
determining a direction in response to the receipt of the image, the direction being one in which the target subject was likely to move during a time period in the past or is likely to move during a time period in the future;
determining a target area within which another image of the target subject can be expected to appear based on the determined direction; and
determining if a portion of a subsequent image is inside the determined target area to identify if the subsequent image is one relating to the target subject, wherein the subsequent image is one taken during the time period in the past or during the time period in the future.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

This application is based upon and claims the benefit of priority from Singapore patent application No. 10201906302X, filed on Jul. 5, 2019, the disclosure of which is incorporated herein in its entirety by reference.

REFERENCE SIGNS LIST 10 apparatus
11 processor
12 memory
102 apparatus
104 processor
106 memory
110 image capturing device
600 computer system
602 display interface
606 communication infrastructure
607 processor
608 main memory
610 secondary memory
612 hard disk
617 removable storage drive
622 removable storage unit
626 communication path
627 communication interface
650 interface
652 audio interface
655 display
657 speaker(s)
677 removable storage medium

The invention claimed is:

1. A non-transitory computer readable medium storing a program for causing a server to execute:
obtaining, by the server, a first image captured by an image capturing device;
caching, by the server, information related to a subject in the first image;
obtaining, by the server, a second image captured by the image capturing device, wherein the subject is in the second image;
obtaining, by the server, cached information related to the subject based on the second image being obtained;
determining, by the server, whether the second image is captured before the first image is captured;
determining, by the server, whether a part of the second image appears in a first region located at coordinates that are in a first direction relative to coordinates of a part of the first image if the second image is an image captured before the first image chronologically, wherein the first direction is one in which the subject was likely to move during a previous time period;
determining, by the server, whether a part of the second image appears in a second region located at coordinates that are in a second direction relative to coordinates of a part of the first image if the second image is an image captured after the first image chronologically, wherein the second direction is one in which the subject is likely to move during a future time period;
recording, by the server, the second image as a duplicate, if the part of the second image appears in the first region, or if the part of the second image appears in the second region; and
selectively storing the second image based on whether the second image is recorded as a duplicate, wherein the selectively storing comprises storing the second image based on the second image not being recorded as a duplicate.

2. The non-transitory computer readable medium according to claim 1, the program further causes the server to execute:
determining, by the server, the first direction or the second direction on the basis of two points on the subject.

3. A server comprising:
at least one processor; and
at least one memory including a computer program code;
the at least one memory and the computer program code being configured to, with the at least one processor, cause the server at least to:
obtain, by the server, a first image captured by an image capturing device;
cache, by the server, information related to a subject in the first image;
obtain, by the server, a second image captured by the image capturing device, wherein the subject is in the second image;
obtain, by the server, cached information related to the subject based on the second image being obtained;
determine, by the server, whether the second image is captured before the first image is captured;
determine, by the server, whether a part of the second image appears in a first region located at coordinates that are in a first direction relative to coordinates of a part of the first image if the second image is an image captured before the first image chronologically, wherein the first direction is one in which the subject was likely to move during a previous time period;
determine, by the server, whether a part of the second image appears in a second region located at coordinates that are in a second direction relative to coordinates of a part of the first image if the second image is an image captured after the first image chronologically, wherein the second direction is one in which the subject is likely to move during a future time period;
record, by the server, the second image as a duplicate, if the part of the second image appears in the first region, or if the part of the second image appears in the second region; and
selectively store the second image based on whether the second image is recorded as a duplicate, wherein the selectively storing comprises storing the second image based on the second image not being recorded as a duplicate.

4. The server according to claim 3,
wherein the at least one memory and the computer program code are configured to, with the at least one processor, cause the server at least to:
determine, by the server, the first direction or the second direction on the basis of two points on the subject.

5. A method comprising:
obtaining, by a server, a first image captured by an image capturing device;
caching, by the server, information related to a subject in the first image;
obtaining, by the server, a second image captured by the image capturing device, wherein the subject is in the second image;
obtaining, by the server, cached information related to the subject based on the second image being obtained;
determining, by the server, whether the second image is captured before the first image is captured;
determining, by the server, whether a part of the second image appears in a first region located at coordinates that are in a first direction relative to coordinates of a part of the first image if the second image is an image captured before the first image chronologically, wherein the first direction is one in which the subject was likely to move during a previous time period;
determining, by the server, whether a part of the second image appears in a second region located at coordinates that are in a second direction relative to coordinates of a part of the first image if the second image is an image captured after the first image chronologically, wherein the second direction is one in which the subject is likely to move during a future time period;
recording, by the server, the second image as a duplicate, if the part of the second image appears in the first region, or if the part of the second image appears in the second region; and
selectively storing the second image based on whether the second image is recorded as a duplicate, wherein the selectively storing comprises storing the second image based on the second image not being recorded as a duplicate.

6. The method according to claim 5, further comprising:
determining, by the server, the first direction or the second direction on the basis of two points on the subject.

* * * * *